(12) United States Patent
Hara et al.

(10) Patent No.: US 6,876,414 B2
(45) Date of Patent: Apr. 5, 2005

(54) SEMI-TRANSMISSIBLE REFLECTOR, SEMI-TRANSMISSION TYPE POLARIZER AND LIQUID-CRYSTAL DISPLAY DEVICE USING THE SAMES

(75) Inventors: Kazutaka Hara, Ibaraki (JP);
Takafumi Sakuramoto, Ibaraki (JP);
Minoru Miyatake, Ibaraki (JP);
Tatsuya Osuka, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 76 days.

(21) Appl. No.: 10/067,292

(22) Filed: Feb. 7, 2002

(65) Prior Publication Data

US 2002/0145690 A1 Oct. 10, 2002

(30) Foreign Application Priority Data

Apr. 9, 2001 (JP) ..................................... P2001-109918

(51) Int. Cl.[7] ............................................ G02F 1/1335
(52) U.S. Cl. .......................................... 349/114; 349/96
(58) Field of Search .............................. 349/96, 113, 114

(56) References Cited

U.S. PATENT DOCUMENTS

| | | | | |
|---|---|---|---|---|
| 4,093,356 A | * | 6/1978 | Bigelow | 349/114 |
| 4,228,574 A | * | 10/1980 | Culley et al. | 445/25 |
| 4,266,859 A | * | 5/1981 | Togashi | 349/177 |
| 4,436,377 A | * | 3/1984 | Miller | 349/114 |
| 4,505,546 A | * | 3/1985 | Umeda et al. | 349/162 |
| 4,533,214 A | * | 8/1985 | Penz et al. | 349/102 |
| 4,545,648 A | * | 10/1985 | Shulman et al. | 349/114 |
| 4,586,790 A | * | 5/1986 | Umeda et al. | 349/102 |
| 4,707,079 A | * | 11/1987 | Inoue | 349/158 |
| 6,546,337 B2 | * | 4/2003 | Fish et al. | 701/213 |

* cited by examiner

Primary Examiner—Kenneth Parker
(74) Attorney, Agent, or Firm—Westerman, Hattori, Daniels & Adrian, LLP

(57) ABSTRACT

A semi-transmissible reflection layer is formed on a light-transmissible polymer substrate uniaxially drawn to have uniaxial orientation characteristic to thereby form a semi-transmissible reflector.

9 Claims, 1 Drawing Sheet

| # SEMI-TRANSMISSIBLE REFLECTOR, SEMI-TRANSMISSION TYPE POLARIZER AND LIQUID-CRYSTAL DISPLAY DEVICE USING THE SAMES

The present application is based on Japanese Patent Application No. 2001-109918, which is incorporated herein by reference.

BACKGROUND OF THE INVENTION

1. Field of the Invention

The present invention relates to a semi-transmissible reflector and a semi-transmission type polarizer used in a liquid-crystal display device (hereinafter referred to also as "LCD") and a liquid-crystal display device using these plates.

2. Description of the Related Art

LCD has been used in a personal computer or the like. The demand for LCD has increased rapidly in recent years. The application of LCD has been widened so that LCD has begun to be used for the purpose of a monitor in recent years.

For example, a polarizer used in LCD is produced as follows. After a dyeing step of dyeing a polyvinyl alcohol (hereinafter referred to also as "PVA") film with dichromatic iodine or dye, a crosslinking step of crosslinking the film with boric acid, borax or the like and a drawing step of uniaxially drawing the film, the polyvinyl alcohol film is dried and stuck onto a protective layer of a triacetyl cellulose (hereinafter referred to also as "TAC") film or the like.

A biaxially oriented polymer substrate or a filler-containing polymer substrate has been heretofore used as the substrate for the semi-transmissible reflector used in LCD.

When a semi-transmissible reflector constituted by a substrate of this type is used in combination with a backlight having polarizing characteristic, there is however a problem that coloring occurs because the influence of retardation reduces transmittance of light with a specific wavelength. A monochromatic liquid-crystal display device is tolerant of weakly uniform coloring but is not tolerant of ununiform coloring. A color liquid-crystal display device is not tolerant of even uniform coloring. Therefore, how to prevent such coloring is a large problem. To solve this problem, reduction in transmittance of light rays emitted from a backlight light source so as to be used as transmitted light rays needs to be suppressed to be not larger than 10% at maximum, preferably not larger than 5%, more preferably not larger than 1% when a semi-transmission type polarizer is used in combination with a backlight having polarizing characteristic.

SUMMARY OF THE INVENTION

Therefore, in order to solve the problem in the related art, an object of the invention is to provide a semi-transmissible reflector and a semi-transmission type polarizer in which coloring due to reduction in light transmittance is minimized, and a liquid-crystal display device using these plates.

To achieve the foregoing object of the invention, there is provided a semi-transmissible reflector including a light-transmissible polymer substrate uniaxially drawn to have uniaxial orientation characteristic, and a semi-transmissible reflection layer formed on the light-transmissible polymer substrate.

Preferably, in the semi-transmissible reflector according to the invention, the semi-transmissible reflection layer is made of a metal vapor-deposited film or metal thin film having light transmissibility.

According to the invention, there is provided a semi-transmission type polarizer including a semi-transmissible reflector defined above, and a polarizer stuck onto the semi-transmissible reflector.

Preferably, in the semi-transmission type polarizer according to the invention, the angle between a retardation axis of the light-transmissible polymer substrate in the semi-transmissible reflector and an absorption axis of the polarizer is not larger than 9 degrees, the polarizer being stuck on the semi-transmissible reflector.

According to the invention, there is provided a liquid-crystal display device including a liquid-crystal cell, at least one semi-transmission type polarizer defined above and disposed on at least one of opposite surfaces of the liquid-crystal cell, and a backlight having polarizing characteristic and combined with the semi-transmission type polarizer.

Preferably, in the liquid-crystal display device according to the invention, a reflection polarizing element is used as the backlight.

Features and advantages of the invention will be evident from the following detailed description of the preferred embodiments described in conjunction with the attached drawings.

DETAILED DESCRIPTION OF THE PREFERRED EMBODIMENTS

Figure 1:
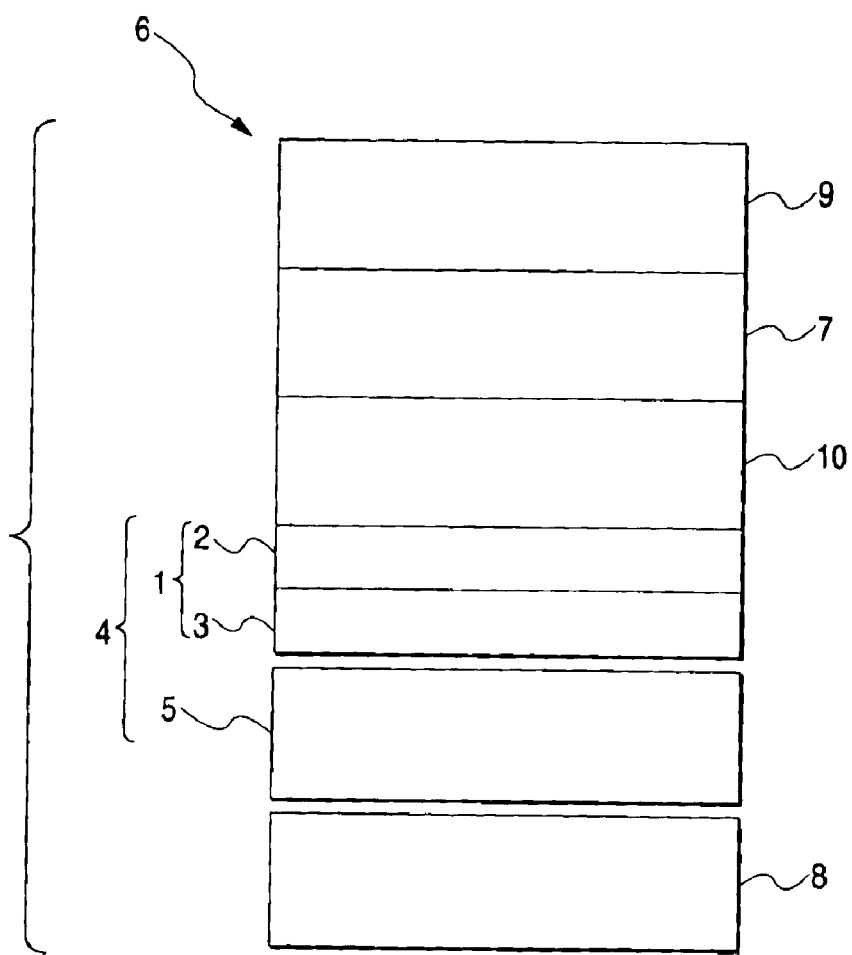
FIG. 1 shows a sectional view of a liquid-crystal display according to the present invention.

A semi-transmissible reflector 1 according to the invention includes a light-transmissible polymer substrate 3 uniaxially drawn to have uniaxial orientation characteristic, and a semi-transmissible reflection layer 2 formed on the light-transmissible polymer substrate 3 as shown in FIG. 1. A resin such as polyethylene terephthalate (PET), polycarbonate (PC), polyether-sulfone (PES), polyvinyl alcohol (PVA), or triacetylcellulose (TAC) can be used as the light-transmissible polymer substrate.

The semi-transmissible reflection layer is made of a metal vapor-deposited film or metal thin film having light transmissibility. Examples of the metal which can be used for the metal vapor-deposited film or metal-thin film include aluminum, silver, silver-palladium alloy, and chromium.

A semi-transmission type polarizer 4 according to the invention includes a semi-transmissible reflector 1 defined above, and a polarizer 5 stuck onto the semi-transmissible reflector as shown in FIG. 1.

The basic configuration of the polarizer 5 used in the invention is as follows. A transparent protective film which serves as a protective layer is bonded, through a suitable adhesive layer, onto one or each of opposite surfaces of a polarizing element made of a dichromatic substance-containing polyvinyl alcohol polymer film. For example, the adhesive layer is made of a polyvinyl alcohol polymer.

A suitable material which can transmits linearly polarized light when natural light is incident on the suitable material and which is prepared by a suitable sequence or method of suitable steps can be used as the polarizing element (polarizing film). Examples of the suitable steps include a dyeing step, a drawing step, a crosslinking step, etc. For example, in the dyeing step, a film of a suitable vinyl alcohol polymer such as polyvinyl alcohol or partially formalized polyvinyl alcohol in accordance with the related art is dyed with a dichromatic substance such as iodine or dichromatic dye. Especially, a material excellent in light transmittance and degree of polarization is preferably used as the polarizing element.

A suitable transparent film can be used as the protective film material which is provided on one or each of opposite surfaces of the polarizing element (polarizing film) so as to serve as a transparent protective layer. An acetate resin such as triacetyl cellulose may be generally used as a polymer for the transparent film but the polymer is not limited thereto.

Incidentally, the semi-transmission type polarizer can be obtained when the reflection layer is provided as a semi-transmission type reflection layer of a half-silvered mirror or the like capable of reflecting a part of light and transmitting the other part of light. The semi-transmission type polarizer is generally disposed on the rear surface of the liquid-crystal cell to thereby make it possible to form a liquid-crystal display device of the type in which the polarizer can reflect incident light from the visual side (display side) to display an image when the liquid-crystal display device is used in a relatively bright atmosphere and in which a built-in light source such as a backlight built in the back side of the semi-transmission type polarizer can be used to display an image when the liquid-crystal display device is used in a relatively dark atmosphere. That is, the semi-transmission type polarizer is useful for formation of a liquid-crystal display device of the type capable of saving energy for use of a built-in light source such as a backlight in a bright atmosphere and capable of using the built-in light source in a relatively dark atmosphere.

In the semi-transmission type polarizer, the angle between the retardation axis of the light-transmissible polymer substrate in the semi-transmissible reflector and the absorption axis of the polarizer stuck onto the semi-transmissible reflector is not larger than 9 degrees, preferably not larger than 6.4 degrees, more preferably not larger than 2.8 degrees.

Further, the liquid-crystal display device 6 according to the invention includes a liquid-crystal cell 7, at least one semi-transmission type polarizer 4 defined above and disposed on at least one of opposite surfaces of the liquid-crystal cell 7, and a backlight 8 having polarizing characteristic and combined with the semi-transmission type polarizer 4 as shown in FIG. 1. Incidentally, a top polarizer 9 and a bottom polarizer 10 are additionally provided in the liquid-crystal cell 7.

The liquid-crystal display device can be formed as a device having a suitable structure according to the related art in which the polarizer is disposed on one or each of opposite surfaces of the liquid-crystal cell. Hence, any suitable liquid-crystal cell can be used as the liquid-crystal cell for forming the liquid-crystal display device. The liquid-crystal cell may be of a suitable type such as an active matrix drive type represented by a thin-film transistor type, a passive matrix drive type represented by a twisted or super-twisted nematic type, and so on.

In the liquid-crystal display device according to the invention, a reflection polarizing element may be used as the backlight.

Examples of the reflection polarizing element which can be used include a cholesteric liquid-crystal polymer film (PCF), a polymer dispersion liquid-crystal film (scatter polarizer), an inorganic crystal dispersion oriented film (scatter polarizer), a retardation anisotropic multilayer lamination drawn film (D-BEF), etc.

The invention will be described below more specifically on the basis of the following examples and comparative examples.

EXAMPLE 1

A norbornene resin ("ARTON" made by JSR Corp.) was cast into the form of a film and then uniaxially drawn to prepare a light-transmissible polymer substrate with a retardation of 140 nm and a thickness of 60 $\mu$m. Aluminum vapor was deposited on the polymer substrate to form an aluminum layer with a thickness of 200 nm. Thus, a semi-transmissible reflector according to the invention was produced. The semi-transmissible reflector had light transmittance of 15% and reflectance of about 40%.

Then, anon-drawn PVA film with a degree of polymerization of 2400, a raw material film thickness of 75 $\mu$m and a raw material film width of 800 mm was drawn/expanded to three times in a first bath containing water as a main component. Then, the film was drawn/expanded to 1.1 times in a dyeing bath of an aqueous solution containing a combination of iodine and potassium iodide. Then, the film was immersed in a crosslinking bath of a combination of boric acid and potassium iodide and drawn/expanded to 1.8 times in a washing bath of water. After dried, the film was wound up as a polarizing element. Then, the polarizing element was stuck onto two TAC films as protective films so as to be sandwiched between the two TAC films. Thus, a polarizer was obtained.

Then, the semi-transmissible reflector and the polarizer were stuck onto each other to produce a semi-transmission type polarizer. This sticking was performed while the direction of the retardation axis of the light-transmissible polymer substrate in the semi-transmissible reflector was made coincident with the direction of the absorption axis of the polarizer. In-plane variation in the retardation axis of the semi-transmissible reflector was ±2 degrees.

Then, the semi-transmission type polarizer was stuck onto the rear surface of a liquid-crystal cell and combined with a backlight using a reflection polarizing element ("PCF film" made by Nitto Denko Corp.) and having polarizing characteristic. Thus, a liquid-crystal display device was produced.

In the liquid-crystal display device, display with transmitted light rays in use of the backlight was observed. As a result, remarkable coloring was not found.

EXAMPLE 2

Polycarbonate made by Teijin Chemicals Ltd. was cast into the form of a film and then uniaxially drawn to prepare a light-transmissible polymer substrate with a retardation of 450 nm and a thickness of 50 $\mu$m. Then, aluminum vapor was deposited on the film to form an aluminum layer with a thickness of 200 nm. Thus, a semi-transmissible reflector according to the invention was produced. The semi-transmissible reflector had light transmittance of 10% and reflectance of about 50%.

Then, the semi-transmissible reflector and a polarizer produced in the same manner as in Example 1 were stuck onto each other to produce a semi-transmission type polarizer. This sticking was performed while the direction of the retardation axis of the light-transmissible polymer substrate in the semi-transmissible reflector was made coincident with the direction of the absorption axis of the polarizer. In-plane variation in the retardation axis of the semi-transmissible reflector was ±2 degrees.

Then, the semi-transmission type polarizer was stuck onto the rear surface of a liquid-crystal cell and combined with a backlight using a reflection polarizing element ("D-BEF" made by 3M Company) and having polarizing characteristic. Thus, a liquid-crystal display device was produced.

In the liquid-crystal display device, display with transmitted light rays in use of the backlight was observed. As a result, coloring was not found.

EXAMPLE 3

A liquid-crystal display device was produced in the same manner as in Example 1 except that a diffusing plate having a fine prismatic structure (embossed structure) on its surface and made of an acrylic resin for reserving polarized light was sandwiched between the semi-transmissible reflector and the polarizer.

In the liquid-crystal display device, display with transmitted light rays in use of the backlight was observed. As a result, coloring was not found.

EXAMPLE 4

A liquid-crystal display device was produced in the same manner as in Example 1 except that a diffusing plate having a fine prismatic structure (embossed structure) on its surface and made of non-drawn polycarbonate for reserving polarized light was sandwiched between the semi-transmission type polarizer and the rear surface of the liquid-crystal cell.

In the liquid-crystal display device, display with transmitted light rays in use of the backlight was observed. As a result, coloring was not found.

EXAMPLE 5

A liquid-crystal display device was produced in the same manner as in Example 1 except that a surface of the light-transmissible polymer substrate was roughened by chemical etching and except that aluminum vapor was deposited on the roughened surface to form an aluminum layer with a thickness of 200 nm. Incidentally, in this example, the roughened surface of the light-transmissible polymer substrate was stuck onto the polarizer.

In the liquid-crystal display device, display with transmitted light rays in use of the backlight was observed. As a result, coloring was not found.

COMPARATIVE EXAMPLE 1

Polycarbonate made by Teijin Chemicals Ltd. was cast into the form of a film and uniaxially drawn to prepare a light-transmissible polymer substrate with a retardation of 450 nm and a thickness of 50 μm. Aluminum vapor was deposited on the substrate to form an aluminum layer with a thickness of 300 nm. Thus, a semi-transmissible reflector was produced as Comparative Example 1. The semi-transmissible reflector had light transmittance of 10% and reflectance of about 50%.

Then, the semi-transmissible reflector and a polarizer produced in the same manner as in Example 1 were stuck onto each other to produce a semi-transmission type polarizer. This sticking was performed while the angle between the retardation axis of the light-transmissible polymer substrate in the semi-transmissible reflector and the absorption axis of the polarizer was selected to be 30 degrees.

Then, the semi-transmission type polarizer was stuck onto the rear surface of a liquid-crystal cell and combined with a backlight using a reflection polarizing element ("D-BEF" made by 3M Company) and having polarizing characteristic. Thus, a liquid-crystal display device was produced.

In the liquid-crystal display device, display with transmitted light rays in use of the backlight was observed. As a result, uniform coloring was found.

COMPARATIVE EXAMPLE 2

A PET resin ("T600" made by Mitsubishi Rayon Co., Ltd.) was prepared as a biaxially drawn light-transmissible polymer substrate with a retardation of 1000 nm. Aluminum vapor was deposited on the substrate to form an aluminum layer with a thickness of 200 nm. Thus, a semi-transmissible reflector was produced as Comparative Example 2. The semi-transmissible reflector had light transmittance of 15% and reflectance of about 40%.

Then, the semi-transmissible reflector and a polarizer produced in the same manner as in Example 1 were stuck onto each other to produce a semi-transmission type polarizer. This sticking was performed while the angle between the retardation axis of the light-transmissible polymer substrate in the semi-transmissible reflector and the absorption axis of the polarizer was selected to be about 15 degrees.

Then, the semi-transmission type polarizer was stuck onto the rear surface of a liquid-crystal cell and combined with a backlight using a reflection polarizing element ("D-BEF" made by 3M Company) and having polarizing characteristic. Thus, a liquid-crystal display device was produced.

In the liquid-crystal display device, display with transmitted light rays in use of the backlight was observed. As a result, ununiform coloring was found.

As described above, in accordance with the invention, because a semi-transmissible reflection layer is formed on a light-transmissible polymer substrate uniaxially drawn to have uniaxial orientation characteristic, a semi-transmission type polarizer little in the influence of the retardation of the light-transmissible polymer substrate on light rays incident on the polarizer can be obtained. Further, when the semi-transmission type polarizer is used in combination with a backlight having polarizing characteristic, reduction in transmittance of light rays emitted from the backlight light source so as to serve as transmitted light rays can be suppressed to be not larger than 10% at maximum, preferably not larger than 5%, more preferably not larger than 1% and, accordingly, coloring due to reduction in transmittance can be minimized.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A semi-transmission type polarizer comprising:

a semi-transmissible reflector comprising a light-transmissible polymer substrate uniaxially drawn to have uniaxial orientation characteristic, and a semi-transmissible reflection layer formed directly on said light-transmissible polymer substrate, and a polarzer stuck onto said semi-transmissible reflector, wherein the anale between a retardation axis of said light-transmissible polymer substrate in said semi-transmissible reflector and an absorption axis of said polarizer is not larger than 9 degrees.

2. A semi-transmission type polarizer according to claim 1, wherein said semi-transmissible reflection layer is made of a metal vapor-deposited film or metal thin film having light transmissibility.

3. A liquid-crystal display device comprising a liquid-crystal cell, at least one semi-transmission type polarizer defined in claim 1 and disposed on at least one of opposite surfaces of said liquid-crystal cell, and a backlight having polarizing characteristic and combined with said semi-transmission type polarizer.

4. A liquid-crystal display device according to claim 3, wherein the backlight comprises a reflection polarizing element.

5. A semi-transmissible reflector type polarizer according to claim 1, wherein, when polarized light is incident on at least one surface of said semi-transmissible reflector type polarizer, the light transmitted through said semi-transmissible reflector type polarizer is reduced by at most 10%, as compared to incident polarized light.

6. A semi-transmissible reflector type polarizer according to claim 5, wherein the light transmitted through said semi-transmissible reflector type polarizer is reduced by at most 5%.

7. A semi-transmissible reflector type polarizer according to claim 1, wherein the light transmitted through said semi-transmissible reflector type polarizer is not reduced by more than 1%.

8. A semi-transmissible reflector type polarizer according to claim 1, wherein the angle between a retardation axis of said light-transmissible polymer substrate in said semi-transmissible reflector and an absorption axis of said polarizer is not larger than 6.4 degrees.

9. A semi-transmissible reflector type polarizer according to claim 1, wherein the angle between a retardation axis of said light-transmissible polymer substrate in said semi-transmissible reflector and an absorption axis of said polarizer is not larger than 2.8 degrees.

* * * * *

UNITED STATES PATENT AND TRADEMARK OFFICE
CERTIFICATE OF CORRECTION

PATENT NO. : 6,876,414 B2
DATED : April 5, 2005
INVENTOR(S) : Kazutaka Hara et al.

It is certified that error appears in the above-identified patent and that said Letters Patent is hereby corrected as shown below:

Column 6,
Line 44, please correct "polarzer" to -- polarizer --.

Signed and Sealed this

Twelfth Day of July, 2005

JON W. DUDAS
*Director of the United States Patent and Trademark Office*